March 2, 1954        K. W. HALL        2,670,626
FORCE MEASURING ATTACHMENT FOR PRESSES
Filed Feb. 23, 1949        2 Sheets-Sheet 1
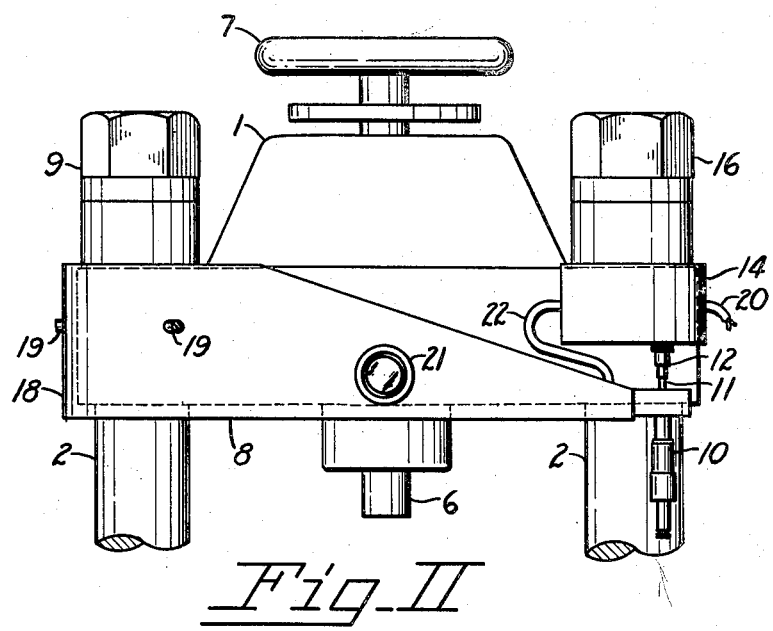
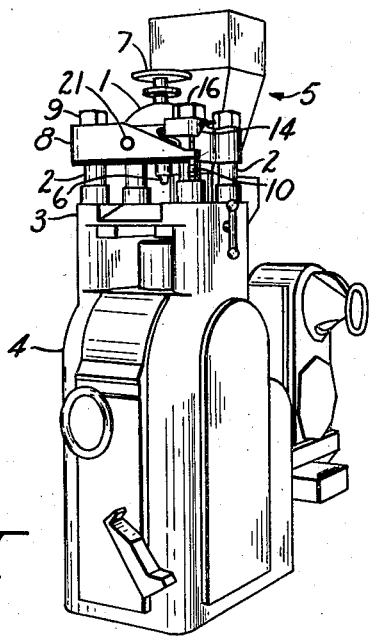
INVENTOR.
Keith W. Hall
BY
Marshall, Marshall & Leonard
ATTORNEYS

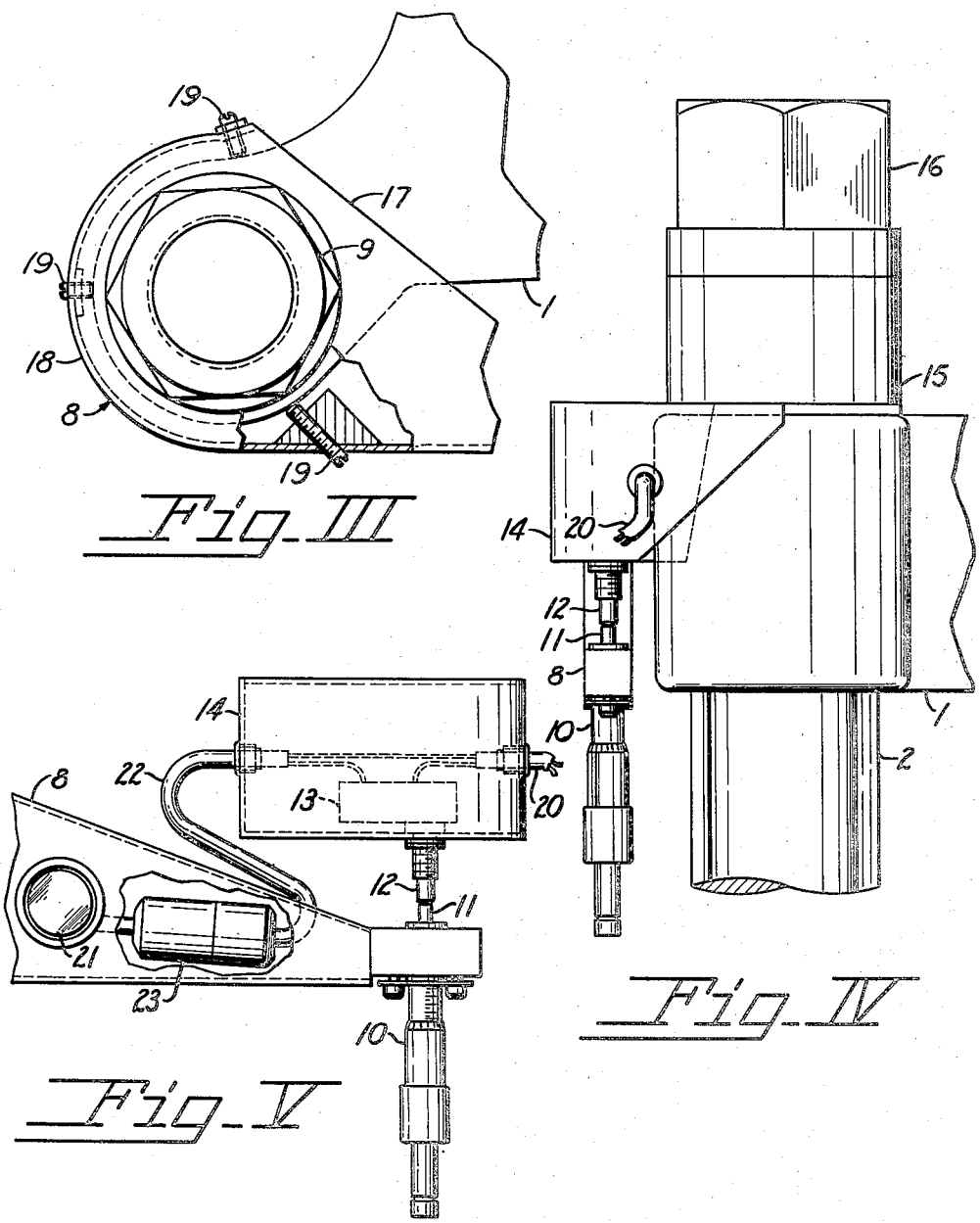

Patented Mar. 2, 1954

2,670,626

UNITED STATES PATENT OFFICE 2,670,626

FORCE MEASURING ATTACHMENT FOR PRESSES

Keith W. Hall, Toledo, Ohio, assignor, by mesne assignments, to Baldwin-Lima-Hamilton Corporation, a corporation of Pennsylvania Application February 23, 1949, Serial No. 77,758

2 Claims. (Cl. 73—88)

This invention relates to presses for the preforming of molding powders and in particular to an attachment for such a press which attachment indicates the maximum pressure exerted by the press during the compacting of a preform.

The characteristics of most molding powders are such that satisfactory preforms may be made throughout a wide range of maximum compacting pressures and that once a satisfactory pressure is obtained little benefit is gained from further increase in pressure. It is difficult however to determine from inspection of a compacted preform whether or not an excessive amount of pressure has been used.

The principal object of this invention is to provide an attachment for a preform molding press which attachment may be kept in continuous operation and which indicates the pressure actually exerted on the preform material during the compacting stroke of the press.

Another object of the invention is to provide an attachment for a preforming press that may be adjusted to indicate the attainment of desired preforming pressures and the indication of which may be employed in adjusting the press to exert such pressures.

More specific objects and advantages are apparent from the following description of a preferred form of the invention.

According to the invention the deflection of the head of the press, as it elastically yields under the compacting pressure, actuates an extension lever and the resulting movement at the end of the lever is employed to operate a sensitive indicating mechanism to indicate the magnitude of the compacting pressure. The indicating mechanism may comprise a sensitive switch that permits current to flow to a light bulb or other signal device whenever the pressure exceeds a selected amount. In a preferred form of the invention an extension lever in the form of an arm is attached to one corner of the head of the press so that the arm lies along a side of the head of the press with its free end juxtaposed to a sensitive electrical switch mounted near the other corner of the head of the press. When the head bends under load the slope of the head at the ends changes since the ends are not rigidly held and such change in slope rotates the arm through a small angle that is generally proportional to the force being applied to the molding powder being compacted. The movement of the free end of the arm with respect to the adjacent end of the head operates an electrical switch of a sensitive variety capable of reliably responding to movements in the order of a thousandth of an inch or less.

A micrometer screw is used to adjust the operating point of the switch and to measure the change in dimension required to cause such operating point to correspond with selected deflections of the head as representative of certain load conditions. By calibration the deflection of the head for various applied loads and the corresponding movement of the free end of the arm with respect to the switch may be measured by the use of the micrometer screw. From such calibration the switch may be adjusted to respond to any given or desired compacting pressure and thus actuate a signal through which the operator is informed of the operating conditions within the press.

An improved pressure indicating mechanism constructed according to the invention is illustrated in the accompanying drawings.

In the drawings:

Figure I is an outline view of a preform press on which the pressure indicating equipment may be employed.

Figure II is an enlarged view of the head of such a press showing the equipment in place.

Figure III is an enlarged fragmentary detail showing the mounting of the fixed end of the arm with respect to the head of the press.

Figure IV is an enlarged fragmentary detail showing the mounting of the sensitive switch with respect to the head of the press.

Figure V is an enlarged fragmentary elevation showing the cooperation between the end of the arm and the sensitive switch.

These specific figures and the accompanying description are intended merely to illustrate the invention but not to limit its scope.

An improved pressure indicating mechanism constructed according to the invention may be employed on a crank operated press such as the press illustrated generally in Figure I. In such a press a head mechanism 1 is supported on and reciprocated vertically by a plurality of tie rods 2 which are guided in bearings in an upper portion 3 of the base housing 4 of the press. The tie rods 2 at their lower ends are connected to a crosshead that is slidably mounted within the base housing 4 of the press and that is driven by a crank and connecting rod mechanism connected to a source of power.

A feeding mechanism 5 indicated generally in Figure I is driven by the mechanism of the press so that when the head 1 is at the upper end of its stroke the feeding mechanism 5 registers with and fills a die cavity opening through the upper surface 3 of the base housing 4. As the head 1 starts its downward stroke the feeding mechanism 5 is withdrawn and a punch 6 (Figure II) enters the die cavity and compresses the powder or molding material therein to form a preform.

Automatic mechanism included within the base 4 operates a lower punch that forms the bottom of the die cavity so that the lower punch, as soon as a preform is made, ejects such preform and then returns to its lower position so that the die cavity serves as a measuring cup during the next feeder operation. The amount of pressure applied to the powder in forming the preform is determined by the amount of powder in the die cavity and the height adjustment of the punch 6 with respect to the head 1. The height of the punch 6 may be adjusted with respect to the head 1 by means of a hand wheel 7.

It has been customary in operating a press of this nature to determine the setting of the hand wheel 7 according to the appearance of the preforms as they come from the press. This method has its difficulties in that it is almost impossible to determine from the characteritics of the preform how much pressure has actually been applied thereto. In the compacting of many molding powders a preform of near maximum density is required. To produce these preforms a certain minimum pressure must be applied but little advantage is gained from increasing the pressure over such minimum pressure. Increased pressures are undesirable since more power is required to drive the press and higher loads are imposed on the bearings and frame of the press.

These difficulties from excess pressure may be avoided by adding a pressure indicator to the press to indicate the pressure employed at each stroke of the press. Such a pressure indicator includes an arm 8 secured under a large nut 9. The nut 9 is one of a number of such nuts holding the head 1 on the tie rods 2. The arm 8 extends across the front of the head 1 and its free end carries a micrometer screw 10 having a spindle 11 that cooperates with a plunger 12 of a sensitive electrical switch 13 (Figure V) mounted within a switch housing 14. The housing 14 has a shelf-like flange 15 that fits over another of the tie rods 2 and is held thereon by a nut 16 screwed onto such tie rod 2.

In the preferred construction, the arm 8, which is made of heavy sheet iron, has a flange 17 that fits over one of the tie rods 2 and is clamped against the upper surface of the head 1 when the nut 9 is tightened. In addition, the arm 8 has a generally cylindrical end housing portion 18 that fits around the corner or ear of the head 1. To form a rigid connection with the head a plurality of screws 19 are threaded through the cylindrical wall-like section 18 of the arm to engage the corners of the head 1 and thus rigidly hold the arm 8 against the head.

In the operation of the device, loads that are applied to the punch 6 cause the head 1 to deflect as a beam and by such deflection to change the slope of the surfaces at the corners of the head 1 as well as slightly bend the upper ends of the tie rods 2. This change in slope resulting from the deflection and bending is transmitted to the arm 8 so that its free end, carrying the micrometer screw 10, moves vertically with respect to the adjacent corner of the head 1 through a distance that is generally proportional to the amount of force exerted at the punch 6. The relative movement between the end of the arm 8 and the switch housing 14 is employed to operate the plunger 12 of the sensitive switch 13.

The switch 13 controls the flow of current from a power cord 20 to a light bulb 21 that is mounted in the arm 8 in a position to be conveniently observed by the operator of the press. In order that the device may be easily disassembled and reassembled for use, the electrical connection from the switch box 14 to the light bulb 21 is taken through a flexible lead 22 and a plug-in connector 23 a portion of which is permanently mounted in the arm 8.

The sensitive switch 13 may be any of the variety of snap action switches designed to respond to a mechanical movement of a fraction of a thousandth of an inch. The point at which the switch 13 operates is determined by the adjustment of the micrometer screw 10. When the indicator is originally installed on the press the micrometer screw is carefully adjusted until the switch just operates. This adjustment, which is made without any load on the press, determines the zero position for the micrometer screw. Next the press head is loaded by applying known loads against the punch 6 and determining the setting for the micrometer screw to just operate the switch at each load so that the deflection of the end of the arm 8 with respect to load applied to the head 1 may be used as a measure of load.

In an ordinary press constructed substantially as shown in the drawing it was found that a deflection of one one-thousandth of an inch at the end of the arm 8 corresponded to a force of six tons applied to the punch 6. Thus if it is desired to compress preforms with a maximum pressure of 75 tons the micrometer screw 10 should be turned back .0125 inch. With this adjustment the switch will just close when a force of 75 tons is exerted. Under this condition the switch closes momentarily during each stroke and the light bulb 21 flashes dimly for each stroke of the press if the pressure barely exceeds 75 tons. Should the quantity of powder being pressed in the die cavity as a result of change in bulk factor of the material be somewhat greater, a greater force is exerted and the switch 13 closed for a longer interval of time during each cycle so that the light bulb 21 receives more current and flashes with greater intensity. Should the pressure fail to reach 75 tons with the particular adjustment of the micrometer screw 10 the light does not flash at all.

Operated in this manner the pressure indicating device provides a supervisory check on the operation of the press so that the operator may make his adjustments accordingly and also receive a warning immediately that the desired operating conditions no longer obtain.

The improved pressure measuring instrument may also be used to determine how much pressure is actually being applied in the compressing of a particular sized preform.

Such a measurement is made by slightly advancing the micrometer screw 10 as the press is in operation and noting the adjustment when the light first begins to flash. The difference between the zero reading of the micrometer and the reading at which the light begins to flash, when converted according to the calibration curve for the instrument and press, gives the maximum pressure exerted during the compressing of the preform.

As was mentioned previously the yield of the head 1 as a beam is employed to operate the indicating mechanism and since this yield is very small it is necessary that the arm 8 as well as the switch box 14 be securely attached to their respective corners of the head 1 and that the arm 8, in addition, be rigid so that it will not yield or deflect appreciably under the forces to which it may be subjected. In the embodiment shown both the arm 8 and the switch box 14 have sturdy flanges that encircle the upper ends of the tie rods and that are clamped to the head 1 by the same nuts that hold the head on the tie rods 2. This provides a very rigid mounting for these elements and also insures that they partake of all of the movement or deformation of the head 1 and, further, that they are not subjected to extraneous forces that may affect the indication of load. In the case of the arm 8 additional support is provided in the form of the screws 19 but such support is employed primarily to eliminate any bending or concentration of stress at the bend between the arm 8 and the flange 17.

This mechanism thus comprises a sensitive indicating mechanism that is actuated by elastic deflection of a member subjected to load and which being so actuated serves to indicate the magnitude of the load. In the preferred form electrical indicating mechanism is employed and such mechanism is controlled by a sensitive switch that is actuated by an arm extending along a side of the head 1 and responding to deflection of the head.

Various modifications and specific details of the device may be made without departing from the spirit and scope of the invention.

Having described the invention, I claim:

1. A pressure indicator for a press of the type having a head provided with a substantially horizontally extending surface at one of its corners and a vertically extending surface at said corner presenting a plurality of points of contact at angularly spaced points around said surface, means for supporting the corners of said head whereby the head and said horizontal and vertical surfaces at the corners thereof are deflected upon application of load to the head in a direction that is substantially normal to a plane containing said horizontal surface comprising, in combination, a single rigid cantilever arm having at one of its ends a substantially horizontal portion seated on said horizontal portion of the head and having a vertically extending portion extending alongside said vertical surface adjacent to said points of contact on such vertical surface of the head at the corner thereof, said rigid arm extending horizontally to the other side of the press head, means firmly securing the horizontal portion of the arm to the head, and means for also securing the vertical portion of said arm to the head at said plurality of points, whereby the free end of the cantilever arm has vertical motion in response to the applied load.

2. A pressure indicator for a press of the type having a head provided with a substantially horizontally extending surface at one of its corners and a vertically extending surface at said corner presenting a plurality of points of contact at angularly spaced points around said surface, means for supporting the corners of said head whereby the head and said horizontal and vertical surfaces at the corners thereof are deflected upon application of load to the head in a direction that is substantially normal to a plane containing said horizontal surface comprising, in combination, a rigid cantilever arm having a substantially horizontal portion seated on said horizontal portion of the head and having a vertically extending portion extending alongside said vertical surface adjacent to said points of contact on such vertical surface of the head at the corner thereof, said rigid arm extending horizontally to the other side of the press head, means firmly securing the horizontal portion of the arm to the head, and means for securing the vertical portion of the arm to the head at three of said points located so as to firmly secure the free end of the cantilever arm to the head whereby the arm moves vertically and accurately as a unit with the head in response to deflection of the head upon application of load thereto.

KEITH W. HALL.

References Cited in the file of this patent

UNITED STATES PATENTS

| Number | Name | Date |
|---|---|---|
| 150,115 | Weston et al. | Apr. 21, 1874 |
| 170,467 | Boomer | Nov. 30, 1875 |
| 264,435 | Boschert | Sept. 19, 1882 |
| 575,651 | Kidwell | Jan. 19, 1897 |
| 1,428,637 | Hutchinson | Sept. 12, 1922 |
| 2,177,821 | Dinzl | Oct. 31, 1939 |
| 2,319,299 | Converse | May 18, 1943 |
| 2,454,887 | Schott | Nov. 30, 1948 |
| 2,462,041 | Hohler | Feb. 15, 1949 |

FOREIGN PATENTS

| Number | Country | Date |
|---|---|---|
| 325,187 | Germany | Sept. 14, 1920 |